United States Patent Office 3,570,120
Patented Mar. 16, 1971

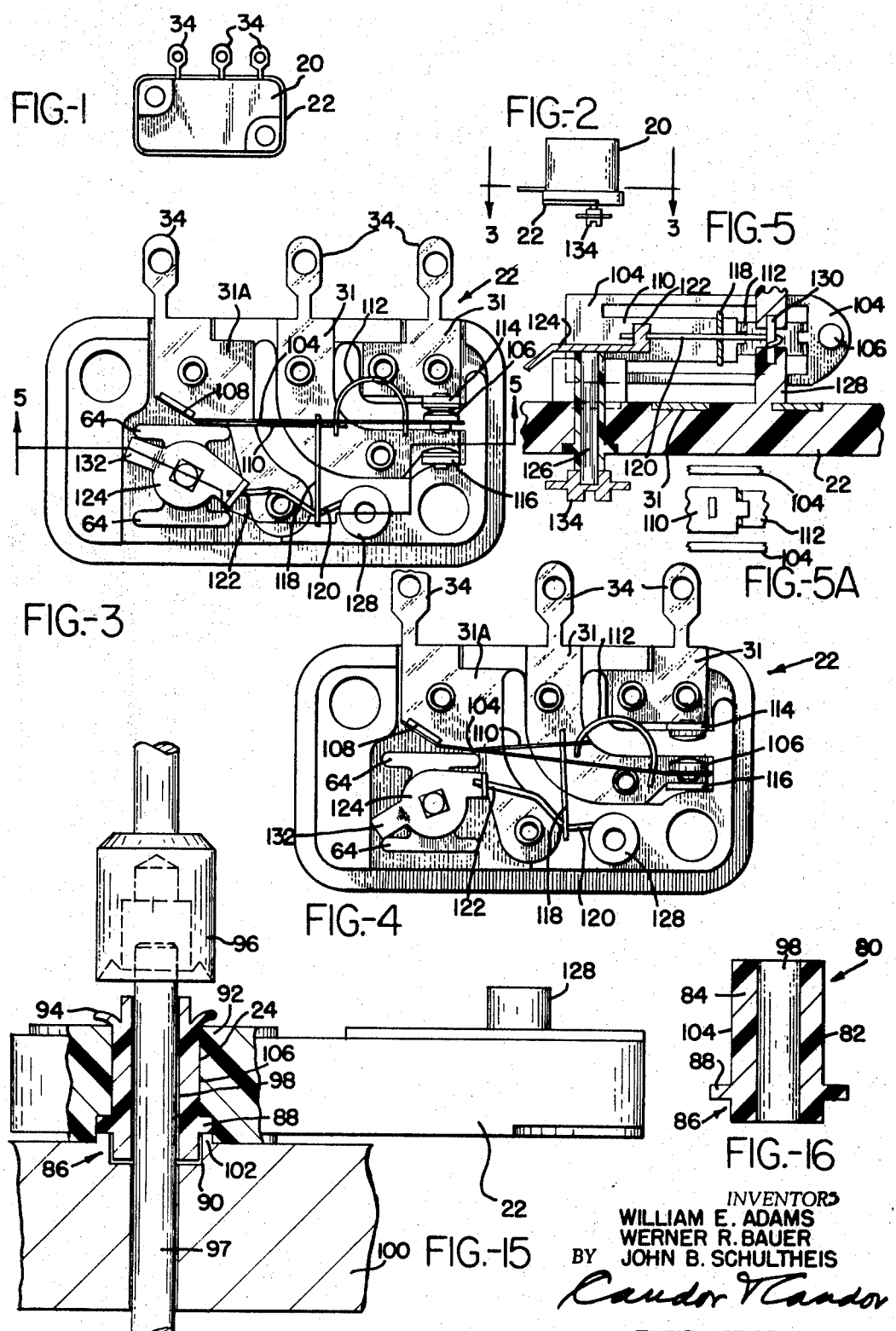

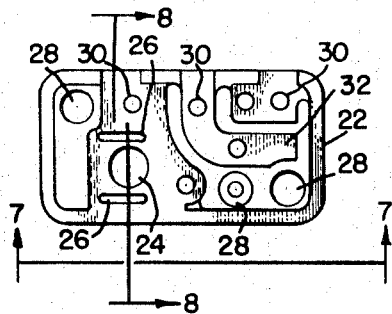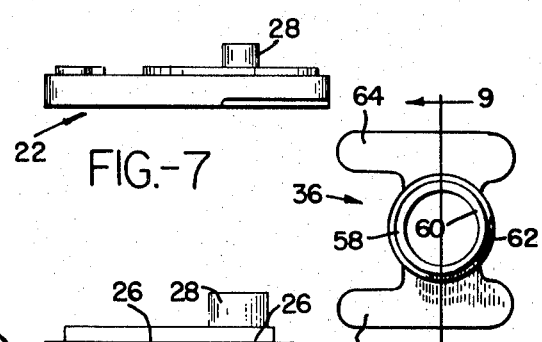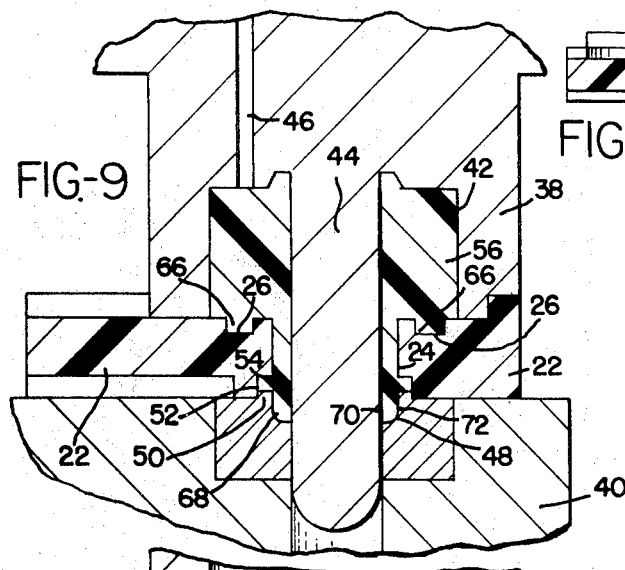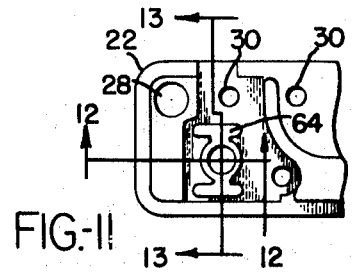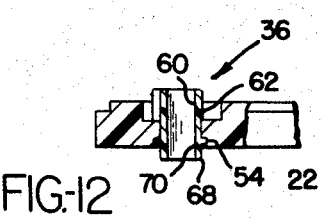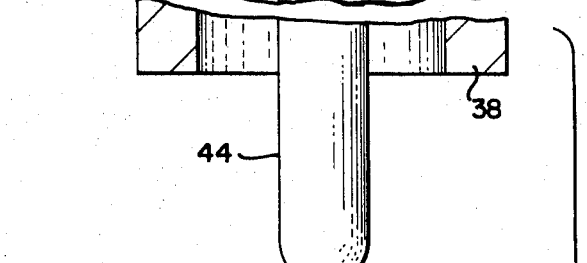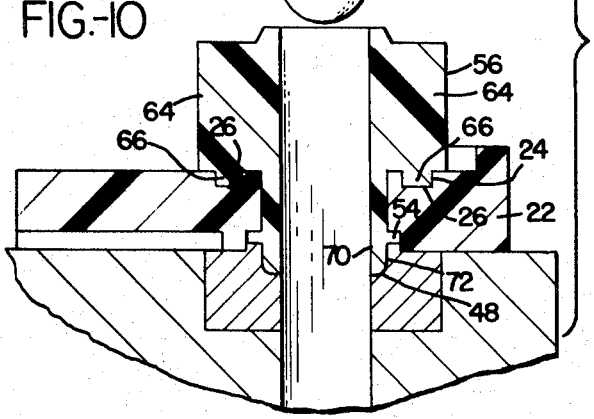

3,570,120
METHOD OF MAKING A SWITCH WITH MOLDED BEARING
William E. Adams, Broadview Heights, Ohio, Werner R. Bauer, Radnor, Pa., and John B. Schultheis, Worthington, Ohio, assignors to Robertshaw Controls Company, Richmond, Va.
Original application May 24, 1965, Ser. No. 458,223, now Patent No. 3,392,253, dated July 9, 1968. Divided and this application Jan. 30, 1968, Ser. No. 701,593
Int. Cl. H01h *11/00*
U.S. Cl. 29—622    9 Claims

ABSTRACT OF THE DISCLOSURE

This application discloses a switch construction made by molding a relatively high temperature resistant thermosetting material into a switch base with a shaft opening passing through the base, and forming a shaft bearing in said opening of relatively low temperature elastic limit thermoplastic material, said bearing being formed at a temperature of said relatively low temperature elastic limit. A switch is placed on said base and a switch shaft is inserted in said bearing and operatively connected to said switch.

---

This application is a division of applicants' copending application Ser. No. 458,223, filed May 24, 1965 for Thermosetting Switch Support With Thermoplastic Bearing.

This invention relates to a switch with a molded bearing and method of making the same.

One of the features of this invention includes a switch construction and method of making the same in which the base of the switch is made of a relatively high temperature resistant and electrically insulating thermosetting material with the material being permanently set. A switch actuating shaft opening is molded during the thermosetting operation to pass through said permanently set base. A shaft bearing is thereafter formed in such shaft opening, the bearing being made of relatively low temperature elastic limit thermoplastic material with the bearing being formed substantially at or in the neighborhood of such relatively low temperature of the elastic limit of the thermoplastic material. This feature permits the base to be formed or molded at the relatively high temperatures required for molding the thermosetting material without harming the bearing. Thereafter, the bearing may be formed at said relatively low temperature in the neighborhood of the elastic limit of the thermoplastic material without harming the previously molded base.

Other features of this invention become apparent from this description, the appended claimed subject matter, and/or the accompanying drawings in which:

FIG. 1 is a top plan view of a switch construction according to this invention, the parts being shown substantially in actual scale in the patent application drawings.

FIG. 2 is a left end elevation of the switch construction of FIG. 1.

FIG. 3 is a top plan view of the switch construction of FIG. 1 in enlarged scale and with the cover removed.

FIG. 4 is a view similar to FIG. 3 with the switch parts in actuated position.

FIG. 5 is a vertical cross section substantially along the line 5—5 of FIG. 3.

FIG. 5A is a view similar to certain parts of FIG. 5 taken adjacent the plane of one of the switch blades.

FIG. 6 is a plan view of the base member shown in FIG. 3 as molded of thermosetting material and without any additional parts and in reduced scale.

FIG. 7 is a side view of FIG. 6 taken from line 7—7 of FIG. 6.

FIG. 8 is a cross section along line 8—8 of FIG. 6, in slightly enlarged scale.

FIG. 9 is a vertical cross section showing the injection molding process of the shaft bearing in the shaft opening of the switch base, with the shaft bearing being shown in cross section substantially along the line 9—9 of FIG. 14.

FIG. 10 shows the apparatus of FIG. 9 at a later stage, with one of the molding dies removed.

FIG. 11 is a plan view of a portion of the base shown in FIG. 6, with the shaft bearing having been molded therein.

FIG. 12 is a vertical cross section taken along the line 12—12 of FIG. 11.

FIG. 13 is a vertical cross section taken along the line 13—13 of FIG. 11.

FIG. 14 is a top plan view of the shaft bearing shown in FIGS. 9 and 10 in a slightly reduced scale.

FIG. 15 is a diagrammatic cross section showing another embodiment of the invention.

FIG. 16 is a cross section of the preformed shaft bearing to be used in FIG. 15.

Certain words indicating direction, relative position, etc., are used in this specification and in the claims for the sake of brevity and clearness. However, it is to be understood that such words are used only in connection with the direction, relative position, etc., as shown in the drawings, and that, in actual use, the parts so described may have entirely different direction, relative position, etc. Examples of such words are "upper," "lower," "vertical," "horizontal," etc.

A switch, and method of manufacturing such switch are disclosed in the drawings of this application and in the description thereof.

A switch according to this invention is diagrammatically shown in FIG. 1 substantially in actual scale in the application drawings. This switch construction is shown in top plan view of FIG. 1, wherein a cover 20, and a base 22 form an insulating casing for the switch construction which may be mounted on the base 22.

The cover 20 and the base 22 may be made of a phenolic molding thermosetting resin of any suitable type, which is of relatively high temperature resistance and is electrically insulative. For example, such base may be made of the material well known in the trade as Bakelite, or any other suitable similar material.

Such base 22 is shown in FIG. 6, with no other parts attached thereto, the base also being shown in FIG. 7 in side elevation, and in FIG. 8 in vertical cross section.

Such base may be rectangular in shape, if desired, and may be generally flat in shape, and may be made or molded from such thermal setting material with a shaft opening 24, and with parallel indentations or troughs 26 on each side of the opening 24.

Other openings and irregularities may be formed on the base 22. For example, the openings 28 may be for the purpose of receiving fastening screws that will fasten the cover 20 to the base 22, and both of these members to any support which may be desired. Other openings 30 may receive rivets to fasten metal conductors 31A on the base, which conductors may be placed in the shallow troughs 32. These conductors, which are embedded in the troughs 32 may have terminal extensions 34, FIGS. 1–4.

A switch actuating shaft bearing 36 may be formed of relatively low temperature elastic limit thermoplastic material, which may be injection molded in the opening 24, and in the adjacent extrusion molds 38 and 40.

The plastic material for the bearing 36 may be any suitable thermoplastic material, which may be injection molded, and may have a sufficiently relatively low temperature elastic limit, and injection flow temperature, so that the same may be injection molded in the previously formed thermoset base 22. For example, such thermoplastic material may be an acetal resin, such as is known in the trade as Delrin, and manufactured by the E. I. du Pont de Nemours Co., Inc., of Wilmington, Del.

The injection molds 38 and 40 may be moved tightly against opposite sides of the previously molded base 22, and over the opening 24. The mold 38 may have a chamber 42, which has a pilot pin 44 passing therethrough. The chamber 42 is connected by a passageway 46 to a source of supply of the thermoplastic material, such source being capable of producing the necessary pressure and temperature to injection mold the bearing in the casing 42, opening 22, and lower chamber 48 in the lower mold 40.

If desired, the lower mold 40 may have a small lip 50 extending into a flange forming circular recess 52, which is adapted to form the lower circular flange 54.

The base 22 which may be molded from a suitable relatively high temperature resistant and electrically insulating thermosetting material, such as a suitable Bakelite, is capable of resisting temperatures in the order of 450° F. for sufficiently long periods of time, for the purpose herein disclosed, without damage. The thermoplastic material, such as the acetal resin known as Delrin, may have an operating injection range of from 380°–420° F. so that the base 22 is not subjected to any destructively long high temperature, since the injection, once it has been made at a temperature below the safe limit of Bakelite, is cooled as quickly as possible so that it may harden into the finished shaft bearing without damaging the base 22.

The shaft bearing 36 is flanged against the ends of the opening 24 such as by producing the upper flange 56, and a lower flange 54, which is circular in shape.

The upper flange 56 of the shaft bearing may be in the form of a central tube 58, FIG. 14, which has an inner cylindrical surface 60 and an outer coaxial cylindrical surface 62 and which has two parallel wings 64 secured to the outer cylindrical surface 62. If desired, the parallel wings may have downward parallel extensions 66, FIG. 9, which extend into the base 22 at the indentations or troughs 26, which are shown in FIGS. 6, 9 and 10.

The shaft bearing may have a circular lower flange 54 extending into a circular recess 52 at the lower end of the shaft opening. A cylindrical bearing wall 68 extends below the lower flange 54 with coaxial inner and outer surfaces 70 and 72 respectively.

In the embodiment of FIG. 15, a base 22 may be substantially the same as the base 22 heretofore described, and may be provided with a shaft opening 24, substantially the same as shaft opening 24 heretofore described.

The base 22 of FIG. 15 may be made of the relatively high temperature resistant and electrically insulative material heretofore described, such as Bakelite.

A shaft bearing may be preformed of a relatively low temperature elastic limit thermoplastic material, such as Delrin.

The shaft bearing 80, FIG. 16, may be preformed in the form of a bearing tube 82 having an unflanged bearing end 84 and a flanged bearing end 86, which end 86 has a flange 88.

The tube or shaft bearing 80 may be introduced into the opening 24 with the unflanged bearing end 84 initially inserted in the first shaft opening end 90, and finally extending out of the second shaft opening 92 and with the flanged bearing end 86 adjacent the first shaft opening 90.

The base 22 of FIG. 15 and the tubular bearing 80 may then be heated together substantially to the relatively low temperature elastic limit of the thermoplastic material. Then a second or last formed flange 94 may be outwardly cut or flanged or staked by the staking tool 96 after a pin 97 has been inserted in the shaft opening 98. A backup mold or tool 100 may be placed adjacent the end 86 of the preformed bearing 80. The tool 100 may have a lip 102, to hold the flange 88 firmly in place, while the other end of the bearing is being staked by the tool 96. If desired, the flange 94 may be firmly pressed at the end 92 as far down as desired so that the bearing may be held in place.

If desired, the bearing 80, and the opening 24 of FIG. 15 may be made of irregular transverse cross section to prevent the shaft bearing 80 from turning. That is, the outer surface 104, FIG. 16, of the bearing 80 and the inner surface 106 of the opening 24 may be square, elliptical or the like, so that the shaft bearing 80 cannot turn after the bearing has been staked in place.

The tools such as the rod 97, and the fixture 100, and the staking tool 96 are held in place, until the thermoplastic material has cooled below the elastic limit, so that it is maintained in the proper form until it has properly crystallized. Thereafter, such tools may be removed.

The switch structure that may be mounted on the base 22 may be of any desired form. For example, it may have a contact carrying blade 104, FIGS. 3–5A, which carries the movable contact 106, and which is mounted on a bracket 108, which is an upward flange of the conductor 31A, of FIG. 3. An actuating blade 110 is also mounted on the bracket 108. The blades 104 and 110, have tongues which engage the snap spring 112, in a well known manner. The snap spring 112 causes the blade 104 to snap the contacts 106 back and forth to and from the stationary contacts 114 and 116. An actuator insulating rod 118 has an opening through which the wire 120 passes. One end of the wire enters the bracket 122, which bracket 122 is carried by the double-ended lever 124 which is secured to the actuating shaft 126, which shaft passes through the bearing 36 or 80 heretofore described. The other end of the wire 120 is secured to post 128 which may be integral with the base 22, the wire 120 being wound around a metal pin 130, which supports the upper part of the post 128.

The end 132 of the lever 124 engages the wings 64 of the bearing member, and limits the oscillating action of the actuating shaft 126. A suitable rocking member 134 may oscillate the actuating shaft 126 in any suitable manner. The member 134 may in turn be actuated manually, automatically, or in any other manner desired.

While the form of the invention now preferred has been disclosed as required by the statutes, other forms may be used, all coming within the scope of the claims which follow.

What is claimed is:

1. A method comprising:
   molding a relatively high temperature resistant and electrically insulating thermosetting material into a one-piece switch base with a switch actuating shaft opening passing through said base and groove means adjacent said opening and interrupting one of the opposed faces of said base;
   forming a one-piece switch actuating shaft bearing of relatively low temperature elastic limit thermoplastic material in said shaft opening with flange means in said groove means to limit movement of said bearing in one direction relative to said base, said bearing being formed at a temperature of said relatively low temperature elastic limit;
   placing a switch on said base;
   and inserting a switch actuating shaft through said bearing and operatively connecting said shaft to said switch.

2. A method according to claim 1 in which said shaft bearing is injection molded into said shaft opening.

3. A method according to claim 1 in which said shaft bearing is formed in said shaft opening and flanged against the ends of said shaft opening.

4. A method according to claim 3 in which said shaft bearing is injection molded in said shaft opening and flanged against the ends of said shaft opening.

5. A method according to claim 4 in which said shaft bearing is preformed into the form of a bearing tube of said thermoplastic material which is inserted into said shaft opening and then is heated to said relatively low temperature elastic limit and has flanges of said thermoplastic material secured to the ends of said shaft opening and to said bearing.

6. A method according to claim 2 in which said shaft bearing has an upper flange of said thermoplastic material in the form of a central tube which has an inner cylindrical surface and an outer coaxial cylindrical surface and with two parallel wings secured to said outer cylindrical wall.

7. A method according to claim 6 in which said wings have downward parallel extensions in said base.

8. A method according to claim 7 in which said shaft bearing has a circular lower flange defining said flange means and extending into a circular recess defining said groove means at the lower end of said shaft opening.

9. A method according to claim 8 in which said shaft bearing has a cylindrical wall below said lower flange with coaxial inner and outer surfaces.

References Cited
UNITED STATES PATENTS

| | | | |
|---|---|---|---|
| 2,507,638 | 5/1950 | Leahy | 264—249 |
| 2,770,012 | 11/1956 | Bowerman | 264—269 |
| 2,946,096 | 7/1960 | Stahl | 264—249 |
| 3,032,734 | 5/1962 | Zunker et al. | 338—163 |
| 3,200,359 | 8/1965 | Hulbert | 338—163X |
| 3,389,452 | 5/1968 | Jepson et al. | 29—149.5 |
| 3,214,536 | 10/1965 | Wallace. | |
| 3,248,488 | 4/1966 | Stephan | 264—249 |
| 3,240,072 | 3/1966 | Holbrook | 308—238X |

FOREIGN PATENTS 506,132 Italy.

JOHN F. CAMPBELL, Primary Examiner

R. W. CHURCH, Assistant Examiner

U.S. Cl. X.R.

29—148.5; 264—269, 249; 308—238; 310—43